(12) United States Patent
Foisy et al.

(10) Patent No.: US 10,747,185 B2
(45) Date of Patent: Aug. 18, 2020

(54) SYSTEM AND METHOD FOR PERFORMING ENCRYPTION BETWEEN ALARM PANEL AND MONITORING STATION

(71) Applicant: Tyco Safety Products Canada Ltd., Concord (CA)

(72) Inventors: Stephane Foisy, Udora (CA); Derek Smith, Maple (CA)

(73) Assignee: TYCO SAFETY PRODUCTS CANADA LTD., Ontario (CA)

( * ) Notice: Subject to any disclaimer, the term of this patent is extended or adjusted under 35 U.S.C. 154(b) by 374 days.

(21) Appl. No.: 15/897,936

(22) Filed: Feb. 15, 2018

(65) Prior Publication Data

US 2019/0028270 A1 Jan. 24, 2019

Related U.S. Application Data

(60) Provisional application No. 62/536,166, filed on Jul. 24, 2017.

(51) Int. Cl.

| | |
|---|---|
| H04L 9/08 | (2006.01) |
| G05B 15/02 | (2006.01) |
| H04L 9/32 | (2006.01) |
| H04L 29/06 | (2006.01) |
| H04L 29/08 | (2006.01) |
| G08B 29/12 | (2006.01) |
| H04L 29/12 | (2006.01) |
| G08B 17/00 | (2006.01) |

(52) U.S. Cl.
CPC ............ *G05B 15/02* (2013.01); *G08B 29/12* (2013.01); *H04L 9/0838* (2013.01); *H04L 9/0869* (2013.01); *H04L 9/3239* (2013.01); *H04L 63/0428* (2013.01); *H04L 63/0876* (2013.01); *H04L 63/18* (2013.01); *H04L 67/12* (2013.01); *G05B 2219/2642* (2013.01); *G08B 17/00* (2013.01); *H04L 61/6022* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0220880 | A1* | 9/2008 | Barrie | G07F 17/3241 463/42 |
| 2010/0274366 | A1* | 10/2010 | Fata | G06F 11/3048 700/7 |
| 2013/0212372 | A1* | 8/2013 | Christianson | H04L 63/0428 713/100 |
| 2014/0258727 | A1* | 9/2014 | Schmit | G06F 21/445 713/182 |
| 2016/0240076 | A1* | 8/2016 | Chua | G08B 25/009 |
| 2018/0359220 | A1* | 12/2018 | Trivelpiece | G06F 21/604 |

* cited by examiner

*Primary Examiner* — Lynn D Feild
*Assistant Examiner* — Richard A McCoy
(74) *Attorney, Agent, or Firm* — Arent Fox LLP (57) ABSTRACT

A system and method for communication between a building management system control panel and a monitoring station are disclosed. Examples of building management systems include fire alarm systems and security systems. The monitoring station and the control panel establish an encrypted channel between each other. The monitoring station and the control panel then transmit status information over the encrypted channel. In examples, the status information includes alarm information sent from fire control panels, intrusion information sent from security panels, and operational information of the panels and/or monitoring station, in examples.

16 Claims, 3 Drawing Sheets

SYSTEM AND METHOD FOR PERFORMING ENCRYPTION BETWEEN ALARM PANEL AND MONITORING STATION

RELATED APPLICATIONS

This application claims the benefit under 35 USC 119(e) of U.S. Provisional Application No. 62/536,166 filed on Jul. 24, 2017, which is incorporated herein by reference in its entirety.

BACKGROUND OF THE INVENTION

Building management systems such as fire alarm systems and security systems are often installed within a premises such as commercial, residential, or governmental buildings. Examples of these buildings include offices, hospitals, warehouses, multi-unit dwellings, schools or universities, shopping malls, government offices, and casinos. The building management systems generally include building control panels that function as system controllers and distributed sensors and actuators and hybrid sensor/actuator devices.

For example, the fire alarm systems will typically include fire control panels, fire detection/initiation devices and alarm notification devices. The fire detection/initiation devices and alarm notification devices are installed throughout the buildings and connect to the panels. These devices communicate over a local circuit such as a safety and security network, which in turn connects to the fire control panel. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the device is activated and a signal is sent from the activated device over the safety and security network to the fire control panel. The fire control panel then initiates an alarm condition by activating audio and visible alarms of the fire notification devices. Additionally, the fire control panel will also send the indications of fire as alarm information to a monitoring station.

In a similar vein, the security systems typically include security panels and monitoring devices, where the monitoring devices detect indications of intrusions and unauthorized access at or within the building and report to the security panel. The monitoring devices of the intrusion systems often include motion sensor devices, surveillance camera devices, and door controllers that communicate with the intrusion panel over a safety and security network and might also control the door locking/unlocking. Motion sensor devices can detect intrusions and unauthorized access to the premises, and send indications of the intrusions to the security panel. The surveillance camera devices capture video data of monitored areas within the premises, and door controllers provide access to perimeter and/or internal doors, in examples. Additionally, the security panel will also send the indications of intrusions as intrusion information to a monitoring station.

The monitoring stations will typically monitor multiple building management systems from multiple buildings for status information reported from the building control panels of these systems. The monitoring stations process the status information and then notify the proper authorities: the local fire department or fire brigade and other first responders such as medical personnel, security personnel and/or police. Monitoring stations are often required by regulations, making them a standard component of most building management systems, regardless of age or manufacturer of the components of these systems. These monitoring stations can be administered by a third party company, the same company that provides or manufactures the building management systems, building owner, or a public agency, among examples.

Many different types of status information are sent between the building control panels and the monitoring station. The status information includes alarm information sent from fire control panels, intrusion information sent from security panels, and operational information of the panels, in examples. The operational information includes state information of the panels, handshaking signals between the panels and the monitoring stations, and connection data of a communications link between the panels and monitoring station, in examples. In addition, the status information will also often include the location (e.g. street address) at which the panels are installed, and customer-specific information of a sensitive or confidential nature. In examples, this information includes names and addresses of individuals and their telephone numbers, account numbers and personal identification numbers (PIN), alarm codes used to arm and disarm security panels, and possibly other sensitive information. The status information also includes information sent from the monitoring station to the building control panels, such as operational state of the monitoring station.

SUMMARY OF THE INVENTION

Encryption provides the ability to secure communications between communicating endpoint devices. To create a secure communications link between endpoints, each endpoint encrypts data prior to transmission over the link, and decrypts data received over the link. Information exchanged between the endpoints is hidden from third parties. The secure link is also a deterrent to hacking attempts upon the endpoints, in examples.

Encryption typically requires that each endpoint have an operating system that executes encryption software, and have sufficient computing and storage resources to execute the encryption software. The encryption software provides the encryption/decryption at each endpoint and executes on top of the operating system. A widely used and standardized instance of encryption software is Secure Sockets Layer (SSL). To secure communications between endpoints, in one example, the SSL software at each endpoint stores keys to encrypt and decrypt data sent over the communications link between the endpoints. Alternatively, if the endpoints are connected to the internet, the endpoints can upload SSL certificates generated on a remote server. The SSL certificates include the keys required to encrypt and decrypt data.

Installed building management systems vary by age and manufacturer, and the building control panels are typically embedded systems. These embedded systems have limited computing resources and typically do not include an operating system. These systems are also constrained by local and national fire and security regulations such as those provided by Underwriters Laboratories ("UL"), and typically do not connect to the internet.

It has been proposed to provide encryption between some building control panels and monitoring stations. However, the building control panels are typically more modern panels having an operating system. These panels are able to load and execute encryption software. Existing solutions for implementing encryption at these panels include the use of programmed encryption keys or third-party authentication services such as SSL certificates provided by a remote server.

The proposed invention can provide a lightweight and secure system for performing encryption setup between building control panels and monitoring stations. The method can be lightweight, requiring low data usage over the communications link between panel and monitoring station, and can be implemented with minimal processing resources. Information required to encrypt/decrypt data such as encryption keys need not downloaded or otherwise provided to the panels and then stored locally to the panels. Rather, the information such as the encryption keys can be calculated for each communications session, and might be discarded from memory upon completion of each session.

The proposed system can have additional benefits. The system can address the need for self-authentication of the building control panels and monitoring stations as endpoints, as these endpoints may be on isolated Intranets. The encryption means can be secure and can prevent personnel knowledgeable with the encryption function (including the source code) from determining the encryption keys and circumventing the system. The system can also detect tampering attempts upon at each endpoint, and can report the tampering attempts to security personnel.

In general, according to one aspect, the invention features a method for communication between a building management system control panel and a monitoring station. The method comprises the monitoring station and the control panel establishing an encrypted channel between each other, and transmitting status information over the encrypted channel.

In one example, the control panel and a monitoring station might establish an encrypted channel between each other as follows: The building panel passes local panel data to the monitoring station and the monitoring station passes local station data to the building panel over an unencrypted channel, and use the local panel data and the local station data to create a primary set of encryption keys.

In one example, the building panel and the monitoring station can use the local panel data and the local station data to create a primary set of encryption keys by creating a local key on the building panel from the local panel data, t local key being utilized to encrypt data transmitted from the control panel.

Additionally, the building panel and the monitoring station might also use the local panel data and the local station data to create a primary set of encryption keys by creating a local key on the monitoring station from the local station data, the local key being utilized to encrypt data transmitted from the monitoring station. The building panel might share its local panel data over the unencrypted channel with the monitoring station and the monitoring station might create a panel key from the received local panel data in response, the panel key being utilized at the monitoring station to decrypt data received from the building panel.

In examples, the status information includes alarm information provided by fire initiation/detection devices and/or intrusion information provided by monitoring devices that communicate with the building panel over a safety and security network.

Additionally and/or alternatively, the method further comprises sending the status information over the unencrypted channel when the encrypted channel fails.

Security of the encrypted channel can be further enhanced by creating random keys on both the building panel and the monitoring station, and including the random keys in messages passed over the encrypted channel. Connection data associated with the encrypted channel in messages can be passed over the encrypted channel. The building panel and the monitoring station might determine whether the messages are secure based upon the connection data in the messages.

In some cases, the monitoring station and the monitoring station might pass random station data over the encrypted channel and use the random panel data and the random station data to create a fallback set of encryption keys.

In general, according to another aspect, the invention a building management system. The building management system includes a building panel and a monitoring station connected to the building panel via a communications link. The building panel and the monitoring panel establish an encrypted channel between each other over the communications link, and the building panel and the monitoring station transmit status information over the encrypted channel.

In one example, the status information includes operational state information of the building panel and/or monitoring station.

The system might also include a communicator device that is connected between the monitoring station and the control panel. Here, the communications link includes a connection between the communicator device and the monitoring station, and includes a connection between the communicator device and the control panel.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of nouns and the articles "a", "an" and "the" are intended to include the plural forms as well, unless expressly stated otherwise. It will be further understood that the terms: includes, comprises, including and/or comprising, and the like, when used in this specification, specify the presence of stated features, integers, steps, operations; elements, and/or components, but do not preclude the presence or addition of one or more other features, integers, steps, operations, elements, components, and/or groups thereof. Further, it will be understood that when an element, including component or subsystem; is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and will not be interpreted in an idealized or overly formal sense unless expressly so defined herein.

Figure 1:
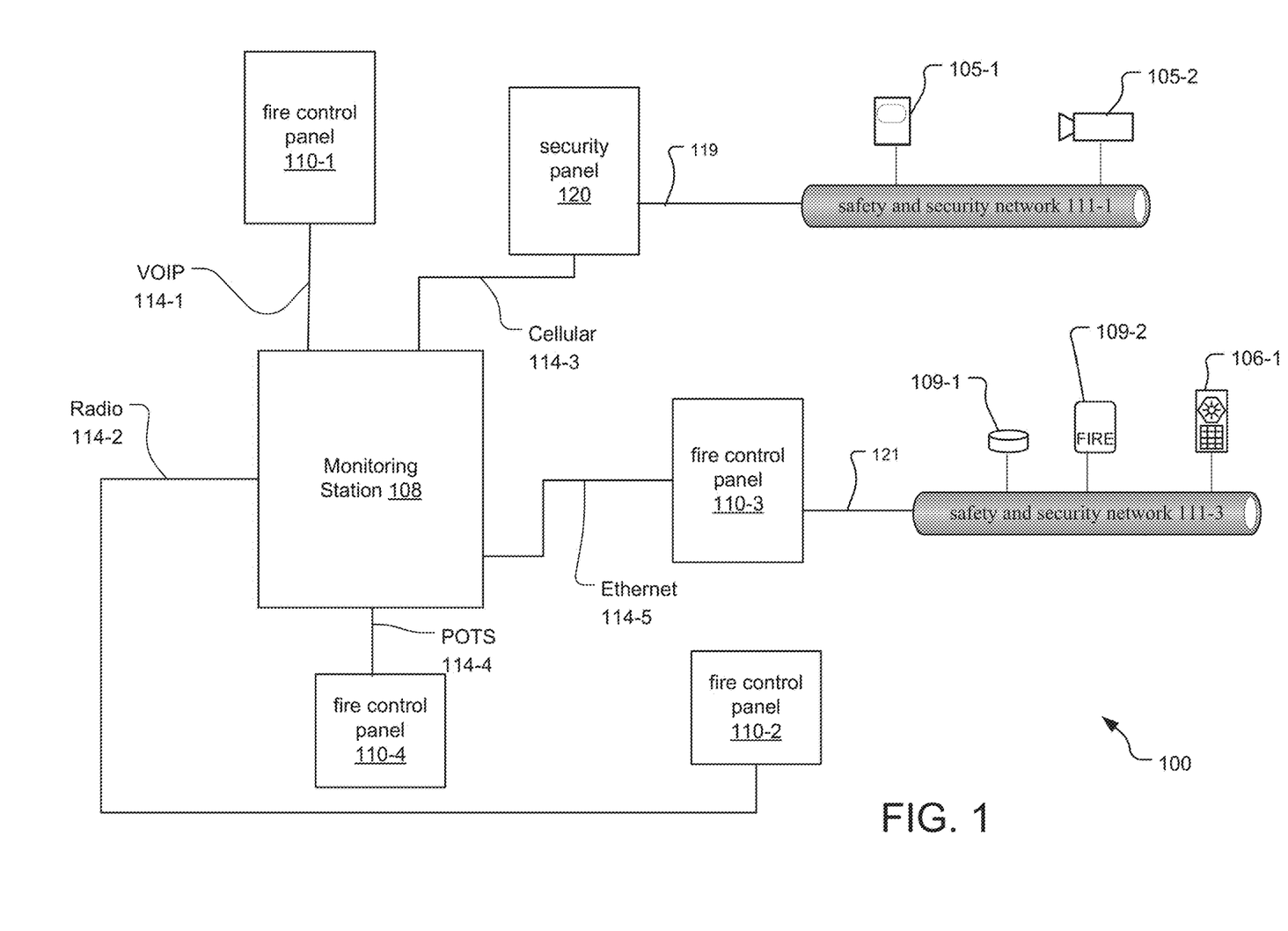
FIG. 1 is a block diagram of building control panels of building management systems communicating with a monitoring station, where fire control panels of a fire alarm system and a security panel of a security system are shown.

FIG. 1 shows an exemplary scenario in which different building control panels of different building management systems 100 communicate with a monitoring station 108. In the illustrated example, each of the panels communicate over a different communications link 114.

In more detail, security panel 120 connects to the monitoring station 108 via cellular link 114-3; and fire control panels 110-1 through 110-4 respectively connect to the monitoring station 108 via VOIP link 114-3, radio link 114-2, Ethernet link 114-5, and Plain Old Telephone Services (POTS) link 114-4, to illustrate possible different types of links.

In more detail, fire control panel 110-3 is connected to its safety and security network 111-3. Fire detection/initiation devices 109 on the safety and security network 111 detect indications of fire, and send alarm information 119 as an example of status information to fire control panel 110-3. Fire detection/initiation devices 109 such as smoke detector 109-1 and pull station 109-2 are shown. Upon detecting the indications of fire, the fire detection/initiation devices 109 also signal alarm notification devices 106 such as strobe 106-1.

Security panel 120 is connected to safety and security network 111-1. Monitoring devices 105 on the safety and security network 111 detect intrusions, and send intrusion information 121 as an example of status information to security panel 120. Monitoring devices 105 such as motion sensor 105-1 and surveillance camera 105-2 are shown.

Figure 2:
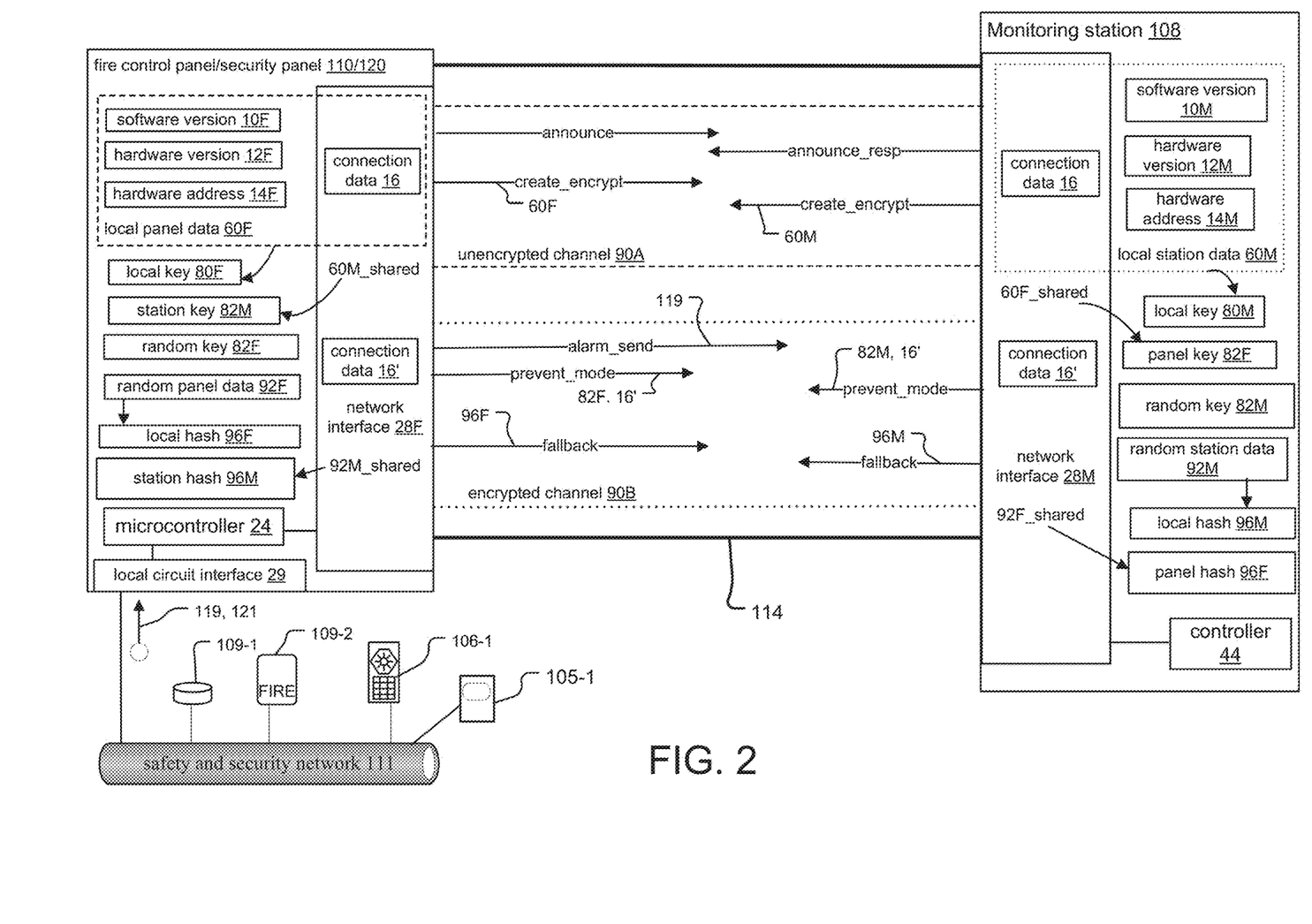
FIG. 2 is a schematic diagram showing an exemplary fire control panel security panel connected over a communication link to a monitoring station, and illustrating establishment of an encrypted channel over the communications link, according to the invention.

FIG. 2 shows an exemplary fire control panel/security panel 110/120 connected over a communication link 114 to a monitoring station 108 and how encrypted channels are established with the monitoring station 108 in accordance with the principles of the present invention.

In more detail, the control panel and the monitoring station will typically first establish an unencrypted channel 90A and then use the unencrypted channel 90A to establish an encrypted channel 90B between one another, over the communications link 114. Once the encrypted channel 90B is established, the control panel and the monitoring station 108 transmit status information over the encrypted channel 90B.

The control panel and the monitoring station as communicating endpoints have network interfaces 28F and 28M, respectively. The endpoints establish the channels 90 using the network interfaces 28, and transmit and receive status information at their network interfaces 28.

The control panel also has a controller such as a microcontroller 24 and a local circuit interface 29. The microcontroller controls the local circuit interface 29 and the network interface 28F. The local circuit interface 29 receives alarm information 119 sent by fire detection/initiation devices 109 and intrusion information 121 sent by monitoring devices 105 on safety and security network 111.

The control panel and the monitoring station 108 initially send information to each other over the unencrypted channel 90A. Specifically, in the illustrated embodiment, the control panel first sends an "announce" message to the monitoring station 108. The message includes current capabilities/features of the control panel, such as whether it supports establishing encrypted channels. If the monitoring station is compatible, the monitoring station 108 responds with an "announce_resp" message. The control panel and monitoring station 108 then communicate their intent to create the encrypted channel 90B by each sending "create_encrypt" messages over the unencrypted channel 90A.

The "create_encrypt" message from the control panel includes local panel data 60F. The local panel data 60F includes information specific to the control panel such as its hardware version 12F, hardware address 14F, and software version 10F, in examples. The local panel data 60F can also include connection data 16 of the unencrypted channel 90A. As a result of sending the message, the local panel data 60F is shared with the monitoring station 108. This is indicated by reference "60F_shared" at network interface 28M of the monitoring station 108.

In a similar vein, the "create_encrypt" message from the monitoring station 108 includes local station data 60M. The local station data 60M includes information specific to the monitoring station 108 such as its hardware version 12M, hardware address 14M, and software version 10M, in examples. The local station data 60M can also include connection data 16 of the unencrypted channel 90A. As a result of sending the message, the local station data 60M is shared with the control panel. This is indicated by reference "60M_shared" at network interface 28F of the control panel.

As a result of exchanging the "create_encrypt" messages, the control panel and monitoring station 108 create a primary set of encryption keys for establishing the encrypted channel 90B. The primary set of encryption keys includes a local key 80F and a station key 82M at the control panel 110, and includes a local key 80M and a panel key 82F at the monitoring panel 110. At the control panel, local key 80F is calculated from the local panel data 60F and is used to encrypt messages transmitted from the control panel. The station key 82M is calculated from the shared local station data 60M_shared and is used to decrypt messages received from the monitoring station 108. At the monitoring station, local key 80M is calculated from the local station data 60M and is used to encrypt messages transmitted from the monitoring station 108. The panel key 82F is calculated from the shared local panel data 60F_shared and is used to decrypt messages received from the control panel.

After the encrypted channel 90B is established, the control panel and monitoring station 108 transmit status information over the encrypted channel 90B. Status information includes alarm (also known as life safety) information 119 sent from fire detection/initiation devices of the safety and security network 111, and operational state information of the control panel and/or monitoring station, in examples. Here, message "alarm send" shows alarm information 119 of the status information sent from the control panel. Alternatively, when the encrypted channel fails, the control panel can send alarm information 119 to the monitoring station over the unencrypted channel. In this case, the monitoring station 108 might flag the message as "unencrypted" to insure proper validation is taking place, thus avoiding a spoofing message.

The control panel and monitoring station 108 as endpoints of the encrypted channel 90B also might check whether the encrypted channel 90B is secure. This is indicated in FIG. 2 by "prevent_mode" messages. For this purpose, the endpoints include additional information of each endpoint (or information common to the endpoints) in the messages passed over the encrypted channel 90B. The additional information/layers of data that are present in the transmitted messages allow for a verified signal based on conditions.

The endpoints then match the additional information in the messages to the corresponding information at each endpoint. In examples, the messages might include information such as random keys 82F, 82M created by the control panel and monitoring station, respectively, and might include connection data 16' of the encrypted channel 90B. The matching of the additional information in the messages at each endpoint is performed, in one example, to determine whether the encrypted channel 90B has been breached or otherwise compromised. If the match fails, this is a likely indication of a possible security breach or an indication of a compromise of the encrypted channel 90B/communication path. In response, the control panel and/or monitoring station 108 can send signals or messages indicative of the breach or compromise to security personnel. In this way, the endpoints will flag this condition to alert the security personnel. This feature is important because many "hackers" claim they can figure out the encryption, or prevent it from working, however the hackers usually fail to mention that the panel and monitoring station 108 did indeed flag the breach/compromise and responded to it. Thus, even if the integrity of the communications is reduced/broken, the security is not, as further (external) actions are taken by security personnel in response to the messages.

The control panel and monitoring station 108 also might create a fallback set of encryption keys in the event of failure of the primary encryption keys. This might occur when the keys become out of sequence, such when packets are lost on the network. This could occur due to large delays in transmission, or if one of the endpoints as receiver is replying while a signal is arriving from the other endpoint, in examples.

The control panel and monitoring station 108 exchange messages over the encrypted channel 90B to create the fallback set of encryption keys. This is indicated in FIG. 2 via "fallback" messages. The fallback set of encryption keys includes a local hash 96F and a station hash 96M at the control panel, and also includes a local hash 96M and a panel hash 96F at the monitoring station 108.

To create the fallback encryption keys, the control panel passes random panel data 92F in a "fallback" message to the monitoring station 108, and the monitoring station 108 similarly passes random station data 92M to the building panel in a "fallback" message. The control panel and monitoring station 108 then create hashes from the random panel data 92F and the random station data 92M.

In more detail, the control panel shares its random panel data 92F with the monitoring station 108. This is indicated by reference 92F_shared at the monitoring station 108. The monitoring station then creates panel hash 96F from the shared random panel data 92F_shared. The random panel data 92F might be generated random numbers, and numbers that are generated based upon various items of connection data 16', in examples. Items within the connection data 16' such as hop count, transmission time delta, and random backoff time between specific signals might be utilized for this purpose because their values typically change over time.

In a similar vein, the monitoring station shares its random station data 92M with the control panel. This is indicated by reference 92M_shared at the control panel. The control panel then creates station hash 96M from the shared random station data 92M_shared.

In another embodiment, the building management system might include a communicator device in addition to the control panel. The communicator device is typically a stand-alone computing device that is connected between the monitoring station and the building control panel. Unlike the control panel, the communicator device can be easily, replaced/upgraded and typically supports communications links not supported by the control panels. In this way, an older control panel lacking the ability to connect to a monitoring station via the internet would be able to do so using the communicator device as an intermediary, for example.

When a communicator device is used in a security system, for example, the communicator device is merely another hop in the communications path between the security panel 120 and the monitoring station 108. In this example, the communications link 114 between the security panel 120 and monitoring station 108 includes the connection/link between the monitoring station 108 and communicator device, and the connection between the communicator device and the security panel 120.

Figure 3:
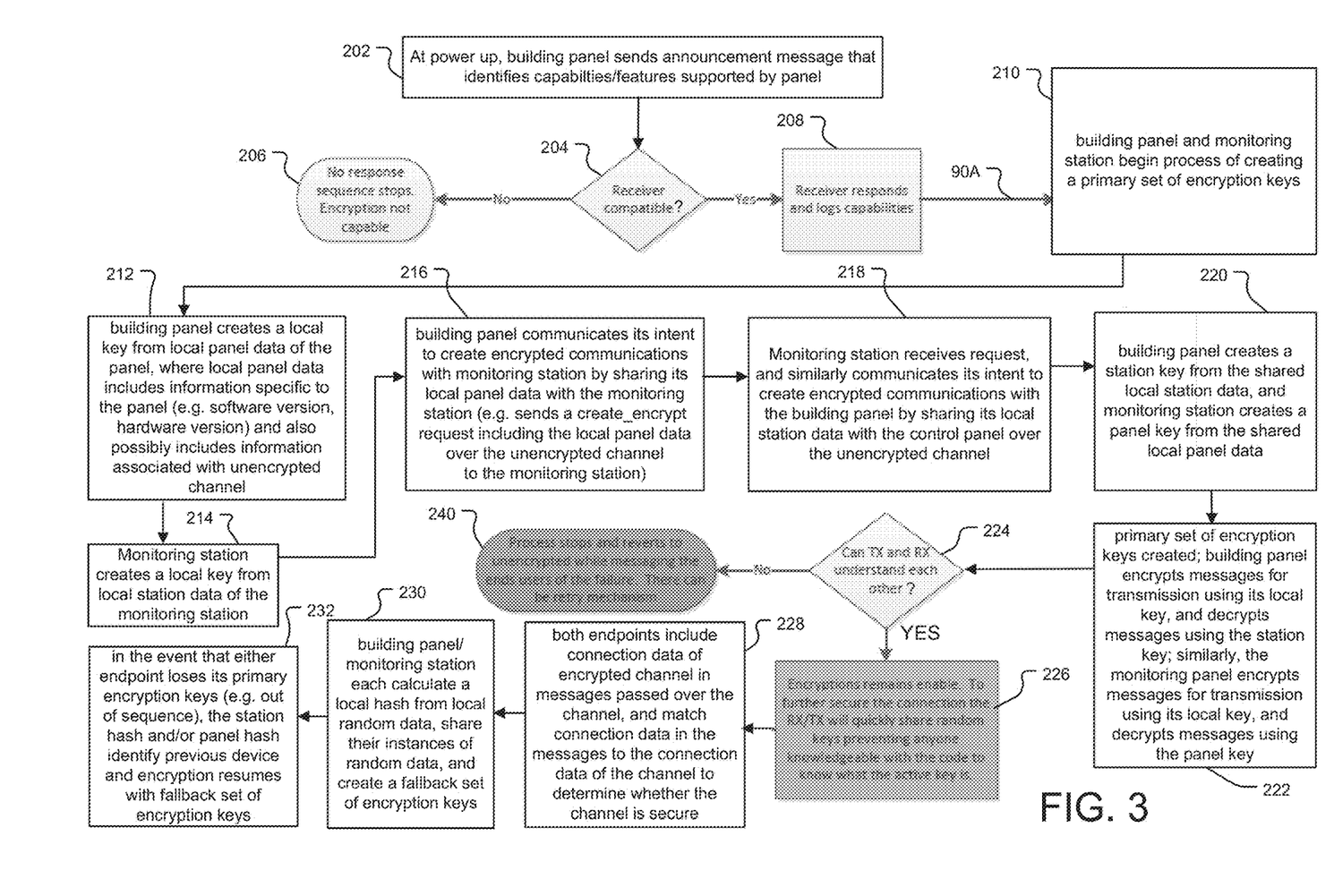
FIG. 3 is a flow diagram showing a method for the establishment of the encrypted channel in FIG. 2, according to the present invention.

FIG. 3 is a method for establishing an encryption channel 90B over a communications link 114 between an exemplary building panel and a monitoring station 108.

In step 202, at power up, a building panel sends an announcement message ("announce") to the monitoring station 108 that identifies capabilities/features supported by the panel. In step 204, the building panel as receiver waits for an "announce_resp" message sent from the monitoring station 108 to determine whether the monitoring station also supports encryption. If no response is received in step 206, indicating that the monitoring station 108 does not support encryption, the panel stops sending its "announce" messages, and normal panel operation resumes, which includes sending alarm over the unencrypted channel 90A.

To ensure backward compatibility, the announce messages will be acknowledged only by a monitoring station 108 that supports the proposed encryption feature. Older monitoring station 108 will not be hindered by the new requests, thus maintaining backwards compatibility. These announce messages are discarded by devices other than the monitoring station 108. In a similar vein, "announce_resp" messages will be discarded by building panels that do not support the proposed encryption feature.

If the monitoring station 108 does support encryption, the monitoring station in step 208 sends the "announce_resp" message and logs the capabilities/features supported by the panel sent in the "announce" message.

According to step 210, the building panel and monitoring station 108 begin the process of creating a primary set of encryption keys. For this purpose, beginning in step 212, the building panel creates a local key 80F from local panel data 60F of the panel, where local panel data 60F includes information specific to the panel (e.g. software version 10F, hardware version 12F) and also possibly includes information associated with the unencrypted channel 90A. This might include connection data 16 that is common to both the panel and monitoring station 108 as endpoints of the unencrypted channel 90A.

In step 214, the monitoring station creates a local key 80M from local station data. 60M of the monitoring station 108. Then, in step 216, the building panel communicates its intent to create encrypted communications with the monitoring station 108 by sharing its local panel data 60F with the monitoring station 108. For this purpose, the panel sends a "create_encrypt" request message over the unencrypted channel 90A to the monitoring station 108. The message includes the local panel data 60F. In step 218, the monitoring station receives the request, and similarly communicates its intent to create encrypted communications with the building panel by sharing its local station data 60M with the panel over the unencrypted channel 60A. For this purpose, the monitoring station 108 sends a "create_encrypt" request message over the unencrypted channel 90A to the monitoring station 108. The message includes the local station data 60M.

According to step 220, the building panel creates a station key 82M from the shared local station data, and the monitoring station 108 creates a panel key 82F from the shared local panel data.

As a result, in step 222, a primary set of encryption keys is created. The primary set of encryption keys are the local key 80F and station key 82M at the panel, and the local key 80M and panel key 82F at the monitoring station 108. In more detail, the panel decrypts messages using its station key 82M and encrypts messages for transmission using its local key 80F. Similarly, the monitoring station 108 decrypts messages using its panel key 82F and encrypts messages for transmission using its local key 80M.

In step 224, the monitoring station 108 and panel as transmitting and receiving endpoints determine whether they can understand encrypted communications by exchanging a test message using the primary set of encryption keys. If communication fails, in step 240, the endpoints stop exchanging test messages, notify end users at each endpoint of the failure to communicate over the encrypted channel 90B, and resume communications over the unencrypted channel 90A. In one implementation, the endpoints periodically retry the exchanging of test messages using the primary set of encryption keys, with exponential backoff algorithm to limit data traffic over the communications link 114. Otherwise, when communication succeeds, the method transitions to step 226.

The encrypted channel 90B is implemented by both the control panel and the monitoring station 108 having encryption keys in conjunction with an encryption algorithm. The control panel and the monitoring station 108 create the encryption keys, and use the keys in conjunction with the encryption algorithm to each encrypt data transmitted to one another, and to each decrypt the encrypted data received by one another and in this way implement the encrypted channel 90B.

In step 226, the endpoints now use the encrypted channel 90B to exchange information unless the feature is administratively disabled by a user or the encrypted channel 90B fails.

The encryption channel 90B is used to transmit information including life safety information from the control panel at the customer premises to the monitoring station 108. The act of using encryption allows for a higher level of security while preventing spoof attacks or other attacks that would prevent the monitoring station 108 from understanding the true source or the event transmitted. However, in some applications, this higher level of encryption may not be offered or is a premium service. Thus, the server system 48, monitoring station 108 and/or control panel may not support this feature.

Once the endpoints use the encrypted channel 90B to exchange information (e.g. status information), the primary encryption keys are "permanent" (i.e. they cannot be changed without user intervention) for the duration of the communications session. Additionally, padded bytes might be added to identify the control panel (or communicator device reporting on behalf of the control panel).

To enhance security for the encrypted channel 90B, in one example, the endpoints also share random keys 82 when communicating. This is indicated via "prevent" messages in FIG. 2 that include the random keys 82. In one example, random keys 82F, 82M are randomly generated numbers on the panel and monitoring station 108, respectively. The random keys 82 are added to the data transmitted over the encrypted channel 90B as a distractor (i.e. to make it difficult for a would-be hacker to determine which strings or sequences of numbers within the data are the primary encryption keys). The random keys 82 are otherwise not processed by the endpoints. The random keys 82 also prevent individuals that have detailed knowledge of the feature and its software code (such as former employees) to ascertain the primary encryption keys.

In more detail, each time the panel prepares to transmit data, the panel appends or inserts its random key 82F within the data, encrypts the data using its local key 80F, and sends the data over the encrypted channel 90B. Typical encryption algorithms utilized at the control panel and the monitoring station 108 include AES128 or AES256 block cypher. Other encryption algorithms might also be used on the panel and monitoring station, but third party authentication such as SSL is avoided in some implementations.

In this example, the new random key is delivered to the monitoring station 108 via the current encryption path and told that further communication will be with the new key to encrypt and decrypt.

The monitoring station 108 decrypts the message using its panel key 82F, but otherwise ignores the "stuffed" random key 82F in the message, unless instructed otherwise. Similarly, the monitoring station "stuffs" its random key 82M into data prior to encryption and transmission over the encrypted channel 90B. The panel decrypts the message using its station key 82M, but otherwise ignores the "stuffed" random key 82M in the message, unless instructed otherwise.

To enhance security for the encrypted channel 90B, in another example, the endpoints also share connection data 16' of the encrypted channel 90B. This is indicated via "prevent" messages in FIG. 2 that include the connection data 16', and described in step 228.

In step 228, the endpoints include various items of connection data 16' within the data to be transmitted, prior to encryption and transmission. Unlike the shared random keys 82, however, the endpoints match the "stuffed" items of connection data 16' in the decrypted messages to corresponding items in the connection data 16'. The items of the connection data 16' to be included within the messages sent from and matched at each endpoint are configured to be the same for both endpoints.

Signals may be generated remotely at the monitoring station 108 and locally at the panel when the messages including the additional random keys 82 and/or connection data 16' data are transmitted/received. The received signals can then be monitored and matched in time as a way to infer whether the encrypted channel 90B has been compromised. For example, even though the monitoring station 108 may not know what alarm condition occurred, it might determine that the customer site at which the control panel is installed has been compromised based upon not receiving these signals from the control panel side of the encrypted channel 90B. In this situation, the monitoring station 108 may initiate its call list to verify the condition of accounts for the customer/customer site at which the control panel is installed.

According to step 230, the endpoints also create a fallback set of encryption keys. As previously provided in the description that accompanies FIG. 2 herein above, the fallback set of encryption keys includes a local hash 96F and a station hash 96M at the panel, and includes a local key 80M and a panel key 82F at the monitoring station 108.

In this way, as described in step 232, in the event that either endpoint loses its primary encryption keys (e.g. become out of sequence), the station hash 96M and/or panel hash 96F identify the previous device (e.g. monitoring device and panel, respectively) and encryption resumes with the fallback set of encryption keys.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for communication between a building management system control panel and a monitoring station, the method comprising:
   the monitoring station and the control panel establishing an encrypted channel between each other comprising:
      the control panel passing local panel data including information unique to the control panel to the monitoring station over an unencrypted channel,
      the monitoring station passing local station data including information unique to the monitoring station to the control panel over the unencrypted channel,
      using the local panel data and the local station data to create a primary set of encryption keys comprising:
         creating a control panel local key by the control panel using the local panel data,
         the control panel local key being utilized to encrypt first data transmitted from the control panel to the monitoring station,
         creating a monitoring station local key by the monitoring station using the local station data,
         the monitoring station local key being utilized to encrypt second data transmitted from the monitoring station to the control panel,
         the control panel sharing its local panel data over the unencrypted channel with the monitoring station,
         the monitoring station creating a panel key from the shared local panel data,
         the panel key being utilized by the monitoring station to decrypt the first data and status information received from the control panel over the encrypted channel,
         the monitoring panel sharing its local station data over the unencrypted channel with the control panel,
         the control panel creating a station key from the shared local station data, and
         the station key being utilized by the control panel to decrypt the second data received from the monitoring station over the encrypted channel;
   and transmitting the status information over the encrypted channel.

2. The method of claim 1, further comprising the status information including alarm information provided by fire initiation/detection devices and/or intrusion information provided by monitoring devices that communicate with the control panel over a safety and security network.

3. The method of claim 1, further comprising sending the status information over the unencrypted channel when the encrypted channel fails.

4. The method of claim 1, further comprising enhancing security of the encrypted channel by creating random keys on both the control panel and the monitoring station, and including the random keys in messages passed over the encrypted channel.

5. The method of claim 1, further comprising enhancing security of the encrypted channel by:
   including connection data associated with the encrypted channel in messages passed over the encrypted channel; and
   the control panel and the monitoring station each receiving the messages, and
   determining whether the messages are secure based upon the connection data in the messages.

6. The method of claim 1, further comprising:
   the control panel passing random panel data to the monitoring station and the monitoring station passing random station data to the control panel over the encrypted channel;
   and using the random panel data and the random station data to create a fallback set of encryption keys.

7. The method of claim 1, wherein
   the control panel passes random panel data to the monitoring station and the monitoring station passes random station data to the control panel over the encrypted channel,
   and wherein the control panel and the monitoring station use the random panel data and the random station data to create a fallback set of encryption keys.

8. The method of claim 1, further comprising the monitoring station and/or control panel determining a possible security breach or an indication of a compromise of the encrypted channel, and the control panel and/or monitoring station sending messages indicative of the breach or compromise to security personnel in response.

9. A building management system, comprising:
   a control panel;
   a monitoring station connected to the control panel via a communications link;
   wherein the control panel and the monitoring station establish an encrypted channel between each other over the communications link comprising:
      the control panel passing local panel data including information unique to the control panel to the monitoring station over an unencrypted channel, the monitoring station passing local station data including information unique to the monitoring station to the control panel over the unencrypted channel, using the local panel data and the local station data to create a primary set of encryption keys comprising:
creating a control panel local key by the control panel using the local panel data,
the control panel local key being utilized to encrypt first data transmitted from the control panel to the monitoring station,
creating a monitoring station local key by the monitoring station using the local station data,
the monitoring station local key being utilized to encrypt second data transmitted from the monitoring station to the control panel,
the control panel sharing its local panel data over the unencrypted channel with the monitoring station,
the monitoring station creating a panel key from the shared local panel data,
the panel key being utilized by the monitoring station to decrypt the first data and status information received from the control panel over the encrypted channel,
the monitoring panel sharing its local station data over
the unencrypted channel with the control panel,
the control panel creating a station key from the shared local station data, and
the station key being utilized by the control panel to decrypt the second data received from the monitoring station over the encrypted channel;
and then transmit the status information over the encrypted channel.

10. The system of claim 9, wherein the status information includes alarm information provided by fire initiation/detection devices.

11. The system of claim 9, wherein the status information includes operational state information of the building panel and/or monitoring station.

12. The system of claim 9, wherein the communications link is a plain old telephone services (POTS) link.

13. The system of claim 9, further comprising a communicator device that is connected between the monitoring station and the control panel, wherein the communications link includes a connection between the communicator device and the monitoring station, and includes a connection between the communicator device and the control panel.

14. The system of claim 9, further comprising:
an unencrypted channel
over which the control panel passes local panel data of the control panel to the monitoring station, and
over which the monitoring station passes local station data of the monitoring station to the control panel;
wherein the control panel and the monitoring station create a primary set of encryption keys from the local panel data and the local station data to establish the encrypted channel.

15. The system of claim 9, wherein the control panel and the monitoring station each create random keys and include the random keys in messages passed over the encrypted channel.

16. The system of claim 9, wherein the control panel and the monitoring station each include connection data associated with the encrypted channel in messages passed over the encrypted channel, and determine whether the messages are secure based upon the connection data in the messages.

* * * * *

UNITED STATES PATENT AND TRADEMARK OFFICE
CERTIFICATE OF CORRECTION

PATENT NO. : 10,747,185 B2
APPLICATION NO. : 15/897936
DATED : August 18, 2020
INVENTOR(S) : Stéphane Foisy et al.

Page 1 of 1

It is certified that error appears in the above-identified patent and that said Letters Patent is hereby corrected as shown below:

In the Specification

In Column 3, Line 44, delete "t local" and insert -- the local --, therefor.

In Column 4, Line 12, delete "invention a" and insert -- invention provides a --, therefor.

In Column 5, Line 14, delete "operations; elements," and insert -- operations, elements, --, therefor.

In Column 5, Line 18, delete "subsystem; is" and insert -- subsystem, is --, therefor.

In Column 5, Line 26, delete "terms; such" and insert -- terms, such --, therefor.

In Column 8, Line 25, delete "easily," and insert -- easily --, therefor.

In Column 9, Line 13, delete "data. 60M" and insert -- data 60M --, therefor.

Signed and Sealed this
Seventeenth Day of November, 2020

Andrei Iancu
*Director of the United States Patent and Trademark Office*